Figure 4:
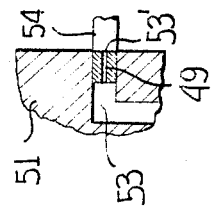

Oct. 4, 1966

R. H. LEBOW 3,276,468

FLUID PUMPING SYSTEM WITH AUXILIARY SHUT-OFF
CONTROL RESPONSIVE TO OVERPRESSURE

Filed March 23, 1964

2 Sheets-Sheet 1

INVENTOR
RALPH H. LEBOW

BY
ATTORNEYS

INVENTOR
RALPH H. LEBOW

United States Patent Office 3,276,468
Patented Oct. 4, 1966

3,276,468
FLUID PUMPING SYSTEM WITH AUXILIARY SHUT-OFF CONTROL RESPONSIVE TO OVERPRESSURE
Ralph H. Lebow, Pacific Palisades, Calif., assignor to Parker-Hannifin Corporation, Cleveland, Ohio, a corporation of Ohio
Filed Mar. 23, 1964, Ser. No. 353,929
21 Claims. (Cl. 137—491)

This invention relates generally to fluid pumping systems and more particularly to aircraft refueling systems having a primary control means to cause shutting off of fuel flow in repsonse to a predetermined pressure in the fuel delivery conduit and having a secondary or auxiliary control means responsive to a somewhat higher pressure to shut off or discontinue flow under pressure in the event the primary control fails to cause the flow to shut off.

In certain types of aircraft refueling systems, a refueling truck is equipped with a pump driven by the internal combustion engine of the truck and carries a delivery conduit connected at one end to the pump. The other end of the conduit has a nozzle for connection to a fuel tank in the aircraft. The pump inlet is connected to either an underground fuel supply tank or to a tank truck. The delivery conduit has either a pressure regulator valve or a shut-off valve for controlling flow of fluid through the conduit and there are suitable control devices responsive to a predetermined fuel pressure in the conduit between the valve and the nozzle for causing the valve to close. Such predetermined pressure may occur for various reasons, such as the aircraft tank becoming full, automatic closing of a tank inlet valve, closing of the nozzle, or for other causes.

It is important that the system be capable of shutting off automatically before the delivery pressure materially exceeds the predetermined pressure as otherwise there may be damage to the system and/or the aircraft tank. For this reason, it is desirable to provide a secondary or "backup" control means for causing discontinuance of fuel delivery in the event the primary control devices fail to do so. The present invention provides several forms of such secondary or backup control means.

In one form, a monitoring valve is installed in such a manner that in the event the primary control devices have failed to cause discontinuance of flow at high pressure when a predetermined pressure is reached, the monitoring valve responds to a somewhat higher pressure to automatically move to idle position the throttle for the engine which drives the pump and in this manner cause discontinuance of flow at high pressure.

In another form, a monitoring valve is installed in such a manner that in the event the primary control system has failed to operate at the predetermined pressure, the monitoring valve responds to a somewhat higher pressure to shut off a source of air under pressure which when connected to the system permits a main shut-off valve to be opened by pump pressure and when disconnected from the system results in closing of the shut-off valve and/or full opening of a bypass valve.

Figure 1:
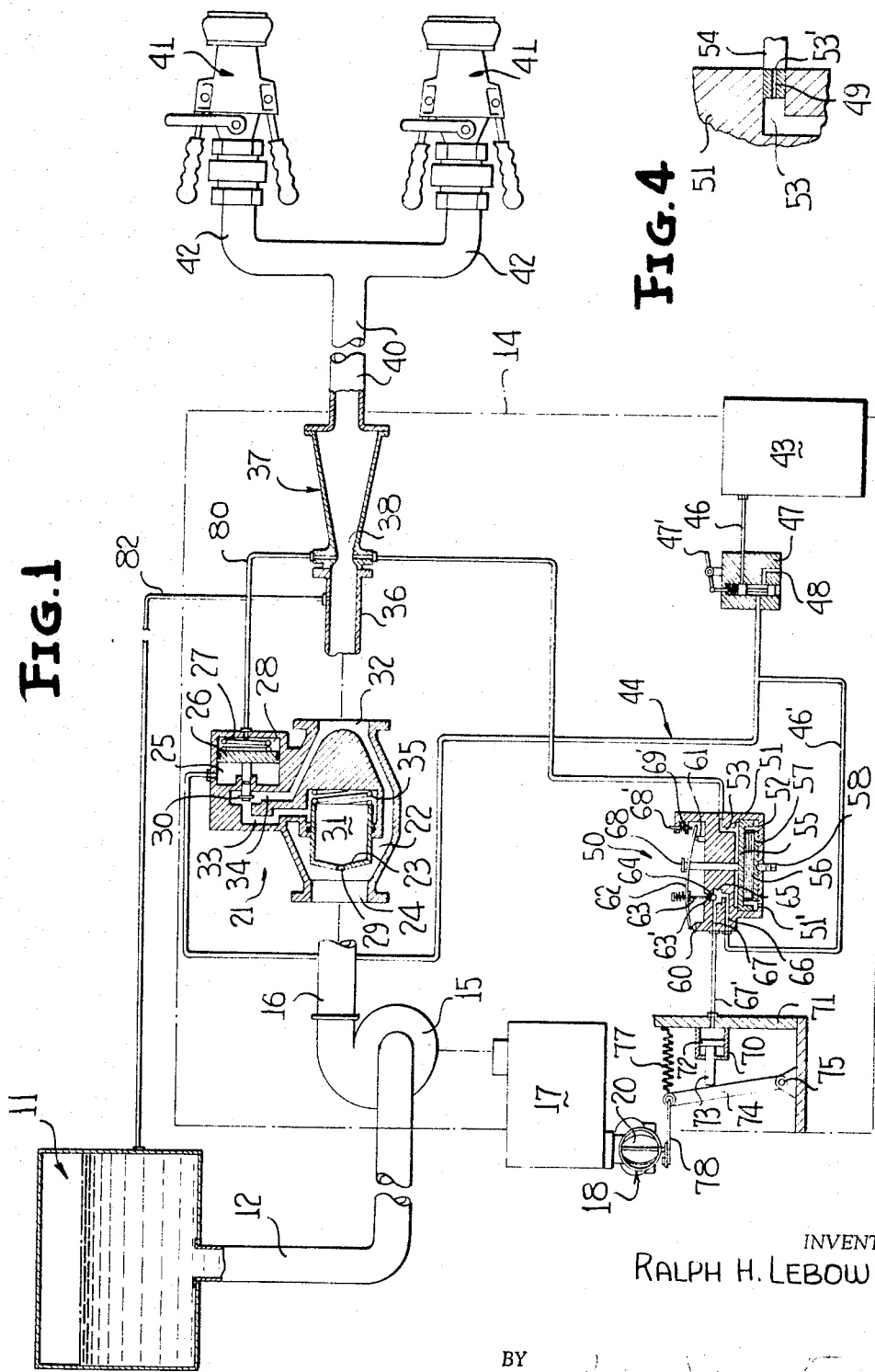
Figure 2:
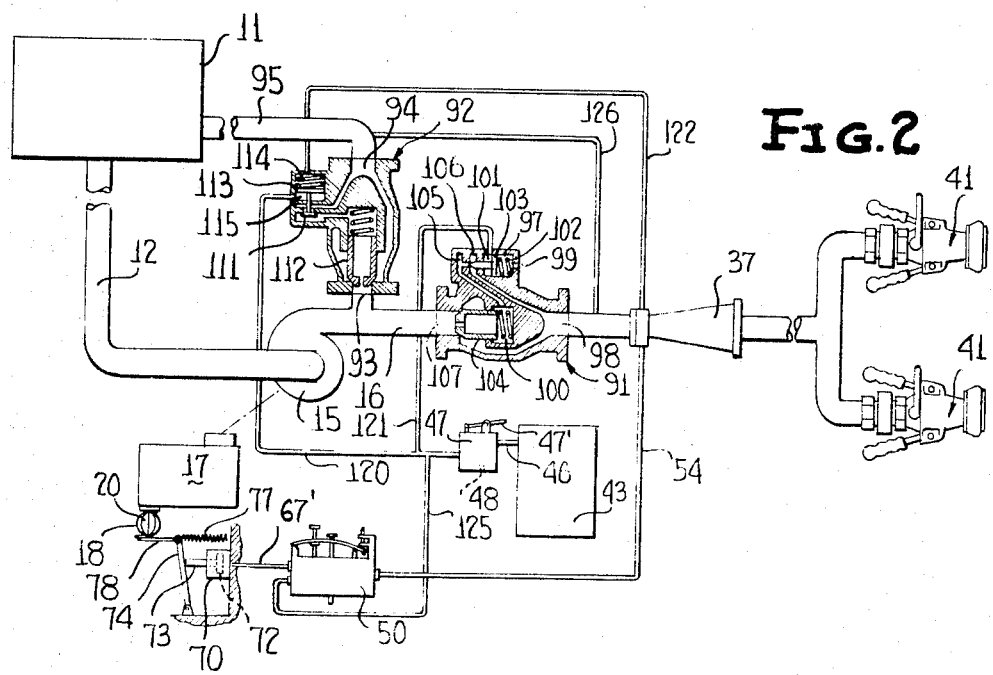
Figure 3:
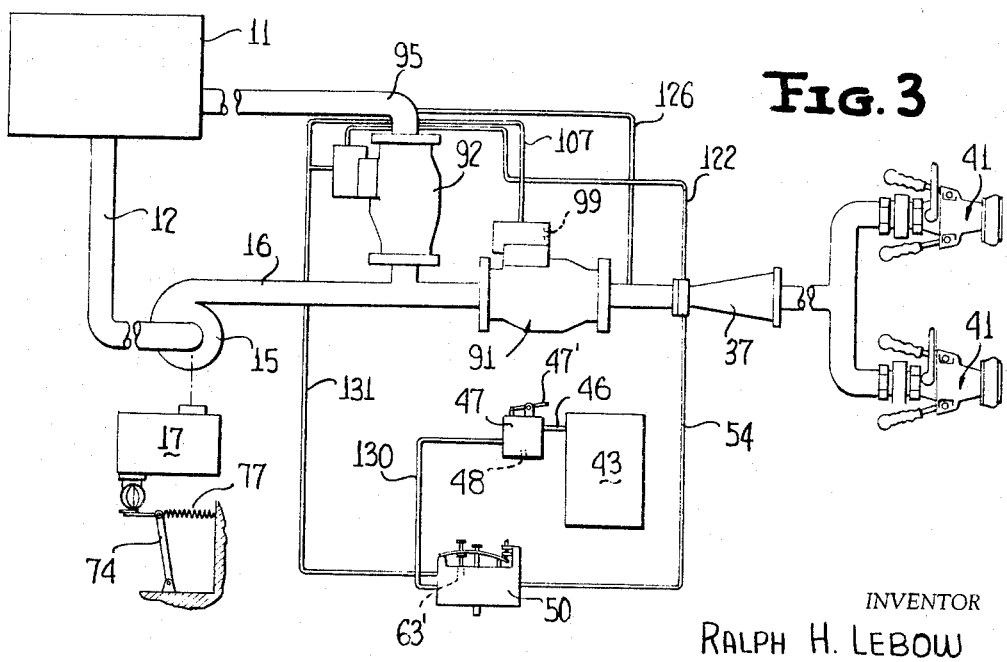

With the above and other objects in view that will be hereinafter apparent, the invention will be understood by reference to the following detailed description, the appended claims and the drawings in which:

FIGURE 1 is a schematic sectional view of a system in which a pressure regulator valve normally closes in response to a predetermined delivery pressure and in which a monitoring valve responds to a somewhat higher pressure for moving the throttle of the engine which drives the pump to idle position in the event the pressure regulator valve fails to close, FIGURE 2 is a system similar to FIGURE 1 except that there is a main shut-off valve and a bypass regulator valve for controlling fuel delivery instead of a pressure regulator valve, and the monitoring valve causes idling of the engine in case the bypass regulator does not function to discontinue flow at high pressure through the shut-off valve when a predetermined pressure has been reached, and FIGURE 3 illustrates a system which utilizes a main shut-off valve and a bypass regulator valve for normally controlling flow in the same manner as FIGURE 2 and in which a monitoring valve responds to overpressure for shutting off an air pressure supply which when on permits the main shut-off valve to be opened by pump pressure and when off results in closing thereof.

FIGURE 4 is a fragmentary view showing a restricted passage in the monitoring valve.

The system of FIGURE 1 includes a fuel supply tank 11 which is usually a tank truck but which may be an underground storage tank. The tank is connected by conduit 12 to a pump 15 which may be mounted on a refueling vehicle (not shown) which may also carry the other apparatus shown in the area set off by broken line 14.

Pump 15 has its delivery port connected to a conduit 16 and is driven by an internal combustion engine 17 which may be the engine of the refueling vehicle. The engine 17 has a conventional throttle 18 and movable throttle plate 20 for regulating the speed of engine 17 and hence regulates the speed and output of pump 15.

A pressure regulator valve 21 having a main flow passage 22 and a fluid pressure operated poppet 23 for opening and closing the main passage 22 is connected at an inlet end 24 thereof to conduit 16. A pilot valve 30 having a piston 26 controls operation of poppet 23. Initially, spring 27 holds piston 26 in a leftward position in which pilot valve 30 closes bleed port 33 leading from chamber 35 to trap fluid entering the latter from inlet 24 through orifice 29 in poppet 23. The pressure of the trapped fluid holds poppet 23 closed. When air at a given pressure is introduced into chamber 25 it moves piston 26 and pilot valve 30 to the right to connect bleed passage 33 to downstream passage 34 to relieve the pressure in chamber 35 and permit fluid pressure at inlet 24 to open poppet 23. This establishes flow from inlet 24 to outlet 32, conduit 36, venturi 37 and conduits 40, 42 to nozzles 41 which are connected to the aircraft tank (not shown) to be filled. The pressure at venturi throat 38 is transmitted to chamber 28 through sensing line 80 and as long as it is at a predetermined value the pressure in chamber 28 plus the pressure of spring 27 counterbalances the air pressure in chamber 25 to maintain pilot valve 30 and poppet 23 open the necessary amount for establishing a flow rate which will maintain the predetermined pressure at venturi throat 38. Upon increase or decrease of the pressure in venturi throat 38, pilot valve 30 and poppet 23 will move as necessary to correspondingly decrease or increase the flow for re-establishing the predetermined pressure at the venturi throat in the well known manner of pressure regulators. When the pressure at the venturi throat remains at or above the predetermined pressure, as will occur for example when the aircraft tanks become full, pilot valve 30 and poppet 23 will fully close to discontinue fuel delivery.

Air pressure for moving piston 26 to the right is supplied to chamber 25 from a tank 43 via conduit 46, dead man valve 47 and conduit 44. Valve 47 is a 3-way valve which is normally spring pressed to a position for closing conduit 46 and venting conduit 44 to atmosphere via passage 48, and which when handle 47' is depressed by an operator closes passage 48 and connects conduit 44 to conduit 46.

Monitoring valve 50 is installed in the system to provide a backup control for causing discontinuance of delivery of fuel to nozzles 41 and the aircraft tanks if for any reason poppet 23 fails to close when fuel pressure in venturi throat 38 exceeds the predetermined value. Valve 50 has a housing 51 providing a chamber 52 having a vent port 51' and a fuel inlet port 53 which is connected by conduit 54 to venturi throat 38.

Inlet port 53 contains a plug 49 having a restricted drilled passage 53' therethrough, as shown in FIGURE 4. A piston 55 is reciprocably mounted in chamber 52 and is constantly urged to a raised position by spring 56. The force exerted by spring 56 may be adjusted by means of screw 58 threaded into casing 51 and bearing against plate 57 which is in contact with one end of spring 56.

Housing 51 has supporters 60, 61 which support a leaf spring 62 which carries a coil spring biased rod 63 to which a ball valve 64 is attached. The coil spring is interposed between leaf spring 62 and a head at the upper end of rod 63. Leaf spring 62 is normally bowed upwardly as shown for causing ball valve 64 to close off an upper passage 63' leading from chamber 65 to atmosphere. Chamber 65 is connected by means of a passage 66 and a conduit 46' to air supply conduit 44. Chamber 65 also has an outlet port 67.

An actuator pin 68 is carried by and projects upwardly from piston 55 and is connected to leaf spring 62. Housing 51 also carries a reset pin 68' which is normally biased upwardly by a coil spring 69'.

Outlet port 67 is connected by means of a conduit 67' to one end of a throttle control cylinder 70 supported on a bracket 71. In cylinder 70 is a piston 72 having a piston rod 73 engageable with a throttle lever 74 connected by means of linkage 78 to throttle valve 18. Lever 74 is pivoted at 75 and is normally urged to a throttle closing or engine idling position by a spring 77.

When the pressure of fuel at venturi throat 38 is below a second predetermined pressure somewhat greater than the first predetermined pressure heretofore mentioned, the pressure of fuel on the upper side of piston 55 is insufficient for overcoming the force of spring 56 and piston 55 remains in its upper position with leaf spring 62 bowed upwardly, as shown. Upon dead man valve handle 47' being depressed, air from tank 43 is supplied through conduits 46, 44 to chamber 25 of regulator valve 27 for opening pilot valve 30 and poppet 23, as previously described. Air pressure from line 44 at this time is also supplied through line 46' and inlet passage 66 to chamber 65 of monitoring valve 50 and passes through port 67 and conduit 67' to the right hand end of cylinder 70 to move piston 72 and throttle lever 74 so that throttle 20 will be fully opened. Engine 17 will then run at full speed for operating pump 15 and causing delivery of fuel from tank 11 to nozzles 41 and the aircraft tanks at a rapid rate. When the aircraft tanks become full, the tank inlet ports are closed by suitable valves which are responsive to the fluid level within the tanks. This causes the pressure in delivery conduit 36 to rise so that the pressure in venturi throat 38 exceeds the first mentioned predetermined value, which, for example, may be 50 p.s.i. This then causes regulator valve 21 to close, as previously described.

Conduit 82 connects conduit 36 to tank 11 or to some other point on the inlet side of pump 15 to relieve locked in fuel pressure between valve 21 and nozzles 41 after poppet 23 has closed. Conduit 82 is of small capacity so that it will bleed off only a small amount of fuel during the fueling operation. Relieving of the locked in pressure also assures against operation of the monitoring valve when poppet 23 closes in its normal manner upon completion of a fueling operation.

If the fuel pressure at venturi throat 38 exceeds the first mentioned predetermined pressure and poppet 23 for any reason fails to shut off, the pressure at throat 38 upon reaching the second predetermined pressure which may, for example, be 60 p.s.i., will act through conduit 54 and restricted passage 53' and cause piston 55 to move downwardly and snap leaf spring 62 over center to a lower position in which it unseats ball valve 64 from passage 63' and causes it to close passage 66. This permits chamber 65 and hence passage 67 and the right hand end of cylinder 70 to be vented to atmosphere through passage 63'. Spring 77 will then move lever 74 to a position in which throttle plate 20 is closed and engine 17 idles. This will substantially discontinue the pumping action so that the pump output pressure will be materially reduced.

Restricted opening 53' acts as a time delay means to delay transmission of the increased pressure at venturi throat 38 to piston 55, thus preventing operation of piston 55 by momentary pressure surges acting in the venturi throat. Such momentary surges can occur, for example, when several tanks are being filled simultaneously and one becomes full before the others. If desired, plug 49 may be of porous metal with no drilled opening therethrough.

When the cause of the malfunctioning of valve 21 has been corrected, monitoring valve 50 may be reset by moving pin 68' downwardly to snap leaf spring 62 to its upper position. Chamber 52 is vented at its lower and to atmosphere by passage 51' to permit proper operation of piston 55, as described.

The arrangement of FIGURE 2 is similar to that of FIGURE 1 except that a shut-off valve 91 is substituted for pressure regulator 21 and a by-pass type pressure regulator 92 is added to the system and has its inlet 93 connected to supply conduit 16 and its outlet 94 connected to supply tank 11 via conduit 95.

Shut-off valve 91 is similar in construction to pressure regulator 21 except that chamber 97 is vented to atmosphere via port 99, rather than being connected to venturi 37. The operation of valve 91 is also similar to that of valve 21 except that when air is admitted to chamber 101, it is sufficiently high in pressure to overbalance the pressure of spring 102 whereby pilot valve 103 and poppet 104 are always full open when chamber 101 is pressurized.

Bypass regulator valve 92 is similar in construction and operation to pressure regulator 21 of FIGURE 1 except that pilot valve 111 and poppet 112 move toward open rather than closed position when spring 113 and fluid pressure in chamber 114 exceed pressure of air in chamber 115.

In the arrangement of FIGURE 2, if pump 15 is turned on prior to operation of dead man valve 47, pilot valve 103 and poppet 104 of shut-off valve 91 remain closed. Pilot valve 111 will be open due to spring 113. Fuel pressure in port 93 will then open poppet 112 and the fuel will bypass back to tank 11 through conduit 95.

Upon operation of dead man valve 47, air under pressure from tank 43 passes through conduit 121 to chamber 101 to move pilot valve 103 to open position for connecting passage 105 to passage 106. This permits pressure in inlet port 107 to fully open poppet 104. At the same time, air under pressure from tank 43 passes through conduit 120 to chamber 115 of bypass regulator valve 92 to move pilot valve toward closed position and hence cause poppet 112 to move toward its closed position for restricting bypassing of fuel from conduit 16 back to tank 11 and thereby causing fuel to flow through valve 91.

The pressure of fuel being delivered through venturi 37 is maintained at a first predetermined valve by slight movement of poppet 112 in opening and closing directions for bypassing more or less of the fuel according to whether the pressure in venturi 37 momentarily exceeds or falls below the predetermined value, a conduit 122 being utilized for transmitting the pressure at the venturi to chamber 114.

When the aircraft tanks are full, or nozzles 41 closed, the pressure in venturi 37 will rise somewhat above the first predetermined value and cause poppet 112 to open fully for bypassing all of the pump output back to tank 11 and normally avoiding any further buildup of fuel pressure downstream of valve 91. Release of dead man valve 47 at this point will close conduit 46 and vent air pressure from chambers 101 and 115 whereupon poppet 104 will close and poppet 112 will remain wide open until pressure in conduit 16 is dissipated. Also, releasing of dead man valve 47 cuts off air pressure being fed to cylinder 70 and vents the latter through the dead man valve to allow spring 77 to return throttle lever 74 to its engine idling position. Restricted bleed line 126 relieves pressure downstream of valve 91 when the latter closes.

Upon the aircraft tanks becoming filed, or upon closing of nozzles 41, if poppet 112 fails to open wide and dead man valve 47 is not promptly released by the operator, the pressure in venturi 37 will continue to rise. Upon reaching the second predetermined value, it will cause operation of monitoring valve 50 and idling of engine 17 with substantial cessation of pumping action in the same manner as described in connection with FIGURE 1.

The arrangement of FIGURE 3 is similar to that of FIGURE 2 except that the connection of the air supply from tank 43 beyond dead man valve 47 to shut-off valve 91 and bypass regulator 92 is through the monitoring valve 50 rather than directly from the dead man valve. Also, there is no cylinder 70 for control by monitoring valve 50 to act upon throttle lever 74. In this arrangement, valves 91 and 92 operate as described in connection with FIGURE 2 for controlling delivery of fuel to the aircraft tanks and bypass regulator 92 opens wide in response to venturi pressure in excess of the first predetermined value for bypassing substantially all the pump output when the aircraft tanks have become full and the dead man valve has not been released. If bypass valve 92 fails to open wide at this time, or for any other reason the pressure at the venturi continues to rise until the second predetermined pressure is reached, the latter causes operation of monitor valve 50 in the manner described in connection with FIGURE 1. Such operation of the monitor valve closes air supply line 130 and opens line 131 to atmosphere through port 63', thus dropping the air pressure in chamber 97 and 114 of valves 91, 92 whereupon valve 91 will close whether or not valve 92 assumes its wide open position. Upon closing of valve 91, restricted bleed line 126 relieves the downstream locked in pressure.

Thus, in each of the arrangements of FIGURES 1, 2 and 3, monitoring valve 50 serves as a secondary control responsive to a second predetermined pressure at the venturi for causing discontinuance of fluid delivery at high pressure to the nozzles.

I claim:

1. Apparatus for controlling the flow of liquid comprising a conduit, valve means for controlling the flow of liquid through the conduit, a source of liquid supply, delivering means upstream of said valve means for delivering liquid under pressure from said source to said valve means, regulating means for increasing or decreasing the flow rate of liquid to said valve means by said delivering means, a first control means responsive to a first predetermined pressure in said conduit downstream of said valve means for discontinuing flow of liquid under pressure through said valve means, and a second control means responsive to a second predetermined liquid pressure downstream of said valve means and operatively connected to said regulating means for operating said regulating means to reduce the flow of liquid under pressure to said valve means in the event said first control means fails to function.

2. The apparatus of claim 1 in which there is a source of control fluid and there is a means for directing the control fluid to the valve means to condition the same for opening upon application of said liquid under pressure to the inlet side thereof.

3. The apparatus of claim 1 in which said first control means operates to cause said valve means to close said conduit.

4. The apparatus of claim 2 in which said valve means is a pressure regulator responsive to pressures in said conduit downstream of said valve means which are lower than said first predetermined pressure for modulating the flow through said valve means in accordance with such lower downstream pressures.

5. Apparatus for controlling the flow of liquid comprising a conduit, valve means for controlling the flow of liquid through the conduit, a source of liquid supply, pumping means for delivering liquid under pressure from said source to said conduit, a first control means responsive to a first predetermined pressure in said conduit downstream of said valve means for discontinuing flow of liquid under pressure through said valve means, a second control means responsive to a second predetermined liquid pressure downstream of said valve means for discontinuing flow of liquid under pressure through said valve means in the event said first control means fails to function, and said second control means includes a means for substantially varying the output of said pumping means.

6. Apparatus for controlling the flow of liquid comprising a conduit, valve means for controlling the flow of liquid through the conduit, a source of liquid supply, pumping means for delivering liquid under pressure from said source to said conduit, a first control means responsive to a first predetermined pressure in said conduit downstream of said valve means for discontinuing flow of liquid under pressure through said valve means, a second control means responsive to a second predetermined liquid pressure downstream of said valve means for discontinuing flow of liquid under pressure through said valve means in the event said first control means fails to function, means for driving said pumping means and said second control means being operative to vary the speed of said driving means.

7. Apparatus for controlling the flow of liquid comprising a conduit, valve means for controlling the flow of liquid through the conduit, a source of liquid supply, delivering means including pumping means for delivering liquid under pressure from said source to said conduit, a first control means for said delivering means responsive to a first predetermined pressure in said conduit downstream of said valve means for discontinuing flow of liquid under pressure through said valve means, a second control means for said delivering means responsive to a second predetermined pressure downstream of said valve means for discontinuing flow of liquid under pressure through said valve means in the event said first control means fails to function, a source of control fluid, means for directing the control fluid to the valve means to condition the same for opening upon the application of said liquid under pressure to the inlet side thereof, and said valve means includes means for regulating the rate of flow of said liquid through said conduit in accordance with the pressure thereof downstream of said valve means.

8. Apparatus for controlling the flow of liquid comprising a conduit, valve means for controlling the flow of liquid through the conduit, a source of liquid supply, pumping means for delivering liquid under pressure from said source to said conduit, a first control means responsive to a first predetermined pressure in said conduit downstream of said valve means for discontinuing flow of liquid under pressure through said valve means, a source of pressurized control fluid, means for utilizing the control fluid to condition the apparatus whereby the pump may deliver liquid under pressure through said valve means, a monitoring valve connecting the pressurized control fluid to said conditioning means, said monitoring valve being operable by a second predetermined pressure and including means for cutting off the supply of control fluid to said conditioning means for causing discontinuance of flow of liquid under pressure through said valve means.

9. Apparatus in accordance with claim 8 in which said monitoring valve has means requiring manual resetting of the monitoring valve to its original operating condition after operation thereof by said second predetermined liquid pressure.

10. Apparatus in accordance with claim 8 in which said monitoring valve has positions for directing and venting control fluid to and from said conditioning means and when operated for cutting off the supply of control fluid to said conditioning means also vents control fluid therefrom.

11. Apparatus in accordance with claim 8 in which said monitoring valve is spring biased to a position for directing control fluid to the conditioning means.

12. Apparatus in accordance with claim 8 in which there is an over center means in said monitoring valve normally biasing the same to a first position for directing control fluid to said conditioning means and movable over center for biasing the monitoring valve to a second position for venting said conditioning means when the monitoring valve is operated by said second predetermined pressure, and means for resetting said monitoring valve to said first position.

13. Apparatus for controlling the flow of liquid comprising a conduit, valve means for controlling the flow of liquid through the conduit, a source of liquid supply, a pump for delivery of liquid from said source to said conduit under pressure, means for driving the pump, a fluid pressure actuated speed control for said driving means, a first control means responsive to a first predetermined pressure of liquid downstream from said valve means for discontinuing flow of liquid under pressure through said valve means, a source of pressurized control fluid, a monitoring valve connecting the control fluid to said speed control for moving the same to a high speed position, said monitoring valve being operable by a second predetermined pressure of liquid downstream of said valve means for disconnecting the control fluid from the speed control whereby the latter may be moved to an idling position.

14. The apparatus of claim 13 in which there is also a means for directing said control fluid to said valve means for conditioning said valve means whereby the same may be opened by liquid under pressure at the inlet end thereof.

15. The apparatus of claim 13 in which said valve means is a pilot valve controlled pressure regulator and there is a means for directing said control fluid to the pilot valve for urging the same to open position, said regulator being operable by pressure of liquid in said conduit upstream of said regulator when said pilot valve is open.

16. The apparatus of claim 13 in which said valve means includes a shut-off valve having an inlet and an outlet connected to said conduit and also includes a bypass regulator having an inlet connected to the conduit and an outlet connected to a region of lower pressure than said conduit, said control fluid being directed to said shut-off valve to condition the same whereby it may be opened by liquid under pressure at the inlet thereof and also being directed to said bypass regulator to condition the same whereby it may be closed when liquid pressure downstream of said shut-off valve is below a predetermined value and means for transmitting such downstream liquid pressure to said bypass regulator.

17. Apparatus for controlling the flow of liquid comprising a conduit, a shut-off valve in said conduit for controlling the flow of liquid therethrough, a source of liquid supply, a pump for delivering liquid from said source to said conduit under pressure, a bypass regulator having an inlet connected to said conduit and an outlet connected to a region of pressure lower than pump output pressure, a source of pressurized control fluid, means including a monitoring valve for directing the control fluid to the bypass regulator to condition the latter whereby it may be closed by liquid pressure in said inlet, said monitoring valve having positions for selectively directing and venting control fluid to and from said bypass regulator, means connecting said monitoring valve and said bypass regulator to said conduit downstream of said shut-off valve, said bypass valve being responsive to a predetermined pressure downstream of said shut-off valve for opening said bypass regulator, and said monitoring valve being responsive to a second predetermined pressure downstream of said shut-off valve for moving said monitoring valve to its position for venting control fluid from said bypass regulator whereby the latter may be opened by liquid pressure in its inlet.

18. Apparatus in accordance with claim 17 in which said control fluid may be also directed to said shut-off valve for conditioning the same to be opened by liquid pressure in said conduit upstream thereof.

19. Apparatus in accordance with claim 18 in which said monitoring valve also controls the supplying and venting of control fluid to and from said shut-off valve.

20. The apparatus of claim 1 in which there is a means for delaying the response of said second control means to said second predetermined pressure.

21. The apparatus of claim 1 in which there is a passage means connecting the second control means to the conduit downstream of said valve means and said passage means includes a restricted portion for delaying the response of said second control means to said second predetermined pressure.

References Cited by the Examiner

UNITED STATES PATENTS

| 2,771,905 | 11/1956 | Griswold | 137—489 X |
| 3,103,891 | 9/1963 | Fulton et al. | 103—16 X |

FOREIGN PATENTS

| 372,196 | 3/1923 | Germany. |
| 938,222 | 10/1963 | Great Britain. |

MARTIN P. SCHWADRON, *Primary Examiner.*